United States Patent
Nakahara

(10) Patent No.: US 9,272,420 B2
(45) Date of Patent: Mar. 1, 2016

(54) ROBOT SYSTEM AND IMAGING METHOD

(75) Inventor: Yoshimitsu Nakahara, Fukuoka (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 245 days.

(21) Appl. No.: 13/603,323

(22) Filed: Sep. 4, 2012

(65) Prior Publication Data

US 2013/0073089 A1 Mar. 21, 2013

(30) Foreign Application Priority Data

Sep. 15, 2011 (JP) ................. 2011-201984

(51) Int. Cl.
*B25J 9/16* (2006.01)
*B25J 9/10* (2006.01)
*B25J 19/02* (2006.01)

(52) U.S. Cl.
CPC ....... *B25J 9/1697* (2013.01); *B25J 9/10* (2013.01); *B25J 9/1692* (2013.01); *B25J 9/1694* (2013.01); *B25J 19/023* (2013.01); *B25J 9/1684* (2013.01); *G05B 2219/36433* (2013.01); *G05B 2219/37555* (2013.01); *G05B 2219/39016* (2013.01); *G05B 2219/39044* (2013.01)

(58) Field of Classification Search
USPC ........ 700/250, 251, 252, 254, 259; 901/9, 41, 901/47
See application file for complete search history.

(56) References Cited

U.S. PATENT DOCUMENTS

| | | | | |
|---|---|---|---|---|
| 5,319,443 A | * | 6/1994 | Watanabe et al. | 356/614 |
| 5,617,335 A | * | 4/1997 | Hashima et al. | 340/815.57 |
| 6,236,896 B1 | * | 5/2001 | Watanabe et al. | 700/37 |
| 6,414,711 B2 | * | 7/2002 | Arimatsu et al. | 348/86 |
| 8,326,460 B2 | * | 12/2012 | Ban et al. | 700/259 |
| 8,346,392 B2 | * | 1/2013 | Walser et al. | 700/259 |
| 8,410,732 B2 | * | 4/2013 | Kassow et al. | 318/372 |
| 8,588,974 B2 | * | 11/2013 | Aoba et al. | 700/248 |
| 8,614,559 B2 | * | 12/2013 | Kassow et al. | 318/568.11 |
| 9,026,234 B2 | * | 5/2015 | Suzuki | 700/56 |
| 2002/0179559 A1 | * | 12/2002 | Hashiguchi et al. | 212/281 |
| 2007/0075048 A1 | * | 4/2007 | Kunisaki et al. | 219/91.1 |
| 2010/0161125 A1 | * | 6/2010 | Aoba et al. | 700/254 |
| 2010/0274390 A1 | * | 10/2010 | Walser et al. | 700/259 |
| 2011/0004343 A1 | * | 1/2011 | Iida | 700/253 |

(Continued)

FOREIGN PATENT DOCUMENTS

| | | |
|---|---|---|
| CN | 1433376 | 7/2003 |
| JP | 60-123974 | 7/1985 |

(Continued)

OTHER PUBLICATIONS

Chinese Office Action for corresponding CN Application No. 201210342306.6, Jun. 4, 2014.

(Continued)

*Primary Examiner* — Jason Holloway
(74) *Attorney, Agent, or Firm* — Mori & Ward, LLP

(57) ABSTRACT

A robot system includes: an imaging unit including an imaging device and a distance measuring part; and a robot to which the imaging unit is attached. The imaging device preliminarily images a workpiece. The robot preliminarily moves the imaging unit based on the result of the preliminary imaging. The distance measuring part measures the distance to the workpiece. The robot actually moves the imaging unit based on the result of the measurement. The imaging device actually images the workpiece.

7 Claims, 11 Drawing Sheets

(56) References Cited

U.S. PATENT DOCUMENTS

| | | | |
|---|---|---|---|
| 2011/0122228 A1* | 5/2011 | Fujieda et al. | 348/46 |
| 2012/0210817 A1* | 8/2012 | Kassow et al. | 74/490.03 |
| 2013/0158947 A1* | 6/2013 | Suzuki | 702/155 |
| 2013/0238125 A1* | 9/2013 | Suzuki | 700/253 |

FOREIGN PATENT DOCUMENTS

| | | |
|---|---|---|
| JP | 08-174457 | 7/1996 |
| JP | 2003-311670 | 11/2003 |

OTHER PUBLICATIONS

Japanese Office Action for corresponding JP Application No. 2011-201984, Dec. 17, 2013.

Japanese Office Action for corresponding JP Application No. 2011-201984, Aug. 20, 2013.

\* cited by examiner

ROBOT SYSTEM AND IMAGING METHOD

CROSS-REFERENCE TO RELATED APPLICATION

This application claims priority from Japanese Patent Application No. 2011-201984 filed with the Japan Patent Office on Sep. 15, 2011, the entire content of which is hereby incorporated by reference.

BACKGROUND

1. Technical Field

This disclosure relates to a robot system and an imaging method.

2. Related Art

Industrial robot control technology has been advanced with computer technology. In the system disclosed in Japanese Patent Application Laid-Open (JP-A) No. 1996-174457, a visual sensor is attached to a robot arm. The visual sensor calculates the amount of displacement of the robot arm with respect to a workpiece. The amount of displacement is used for compensating the position of the robot arm.

SUMMARY

A robot system includes: an imaging unit including an imaging device and a distance measuring part; and a robot to which the imaging unit is attached, wherein the imaging device preliminarily images a workpiece, the robot preliminarily moves the imaging unit based on the result of the preliminary imaging, the distance measuring part measures the distance to the workpiece, the robot actually moves the imaging unit based on the result of the measurement, and the imaging device actually images the workpiece.

An imaging method includes: preparing a robot system that has an imaging unit including an imaging device and a distance measuring part, and a robot to which the imaging unit is attached; using the imaging device to preliminarily image a workpiece; preliminarily moving the imaging unit by the robot based on the result of the preliminary imaging; after the preliminary movement, measuring the distance to the workpiece by the distance measuring part; and actually moving the imaging unit by the robot based on the result of the measurement to actually image the workpiece by the imaging device.

DETAILED DESCRIPTION

Figure 1:
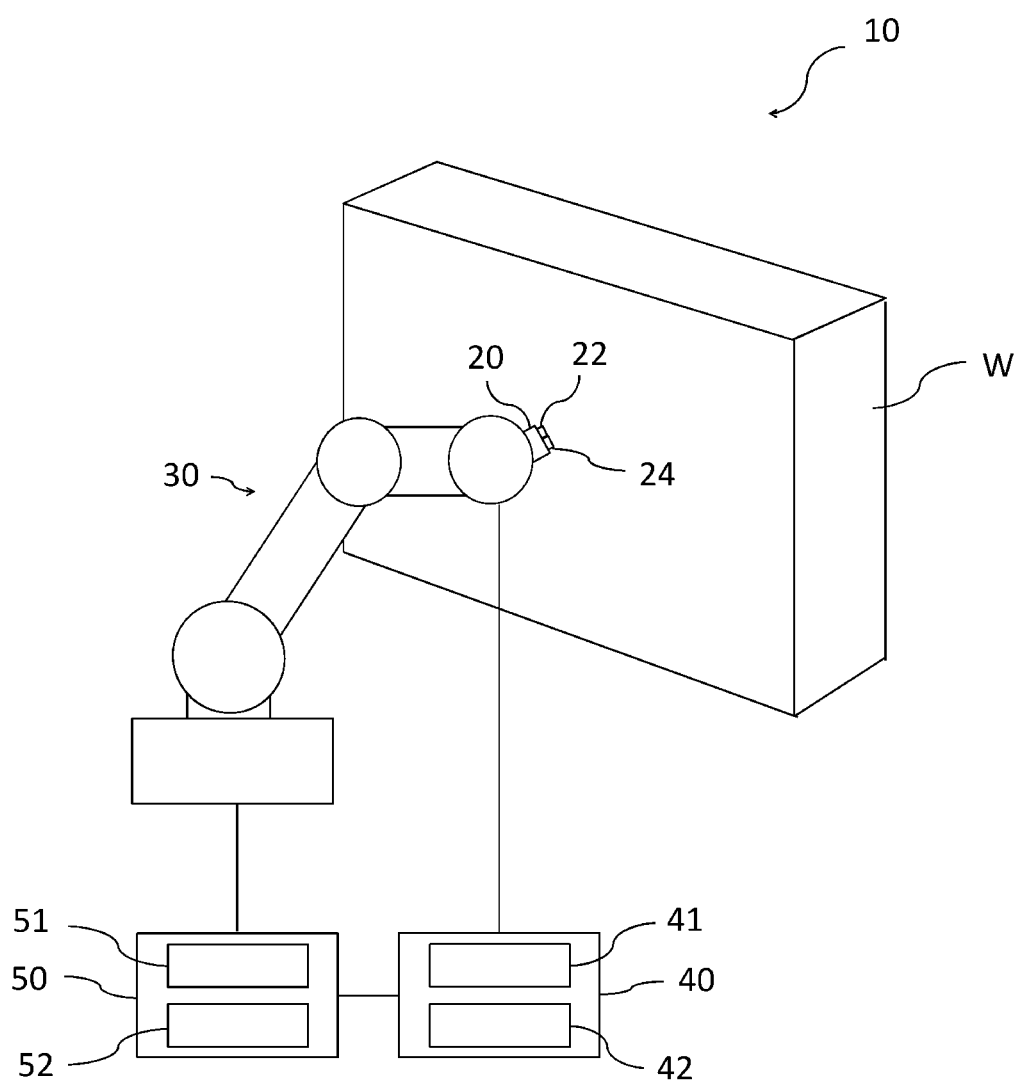
FIG. 1 is a schematic diagram illustrating a robot system of a first embodiment of the present disclosure.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically illustrated in order to simplify the drawing.

Hereinafter, a robot system and an imaging method according to embodiments of this disclosure will be described with reference to the drawings. However, the embodiments of this disclosure are not limited to the following embodiments.

First Embodiment

FIG. 1 illustrates a schematic diagram of a robot system 10 of a first embodiment of the present disclosure. The robot system 10 includes an imaging unit 20, a robot 30 to which the imaging unit 20 is attached, an imaging controller 40, and a robot controller 50. The imaging unit 20 is attached to the end of the robot 30. The robot 30 of this embodiment is an articulated robot including a plurality of actuators each including a servomotor. By driving each of the actuators, the position and direction of the corresponding portion of the robot 30 can be changed. Therefore, the posture of the entire robot 30 and the position/posture of the imaging unit 20 (that is, the three-dimensional position and tilt (orientation) of the imaging unit 20) can be changed, respectively.

The imaging unit 20 has an imaging device 22 and a distance measuring part 24. For instance, the imaging device 22 and the distance measuring part 24 are integrally provided. The imaging device 22 includes, for example, a camera. The imaging device 22 obtains a two-dimensional plane image by imaging. The imaging device 22 has, for example, hundreds of thousands of pixels.

The distance measuring part 24 is a sensor that measures the distance from the imaging unit 20 to an object of interest. In this embodiment, the distance measuring part 24 is moved in response to the change in the posture of the robot 30. The object of interest by the distance measuring part 24 is a workpiece W. The distance measuring part 24 measures the distance from the distance measuring part 24 (the imaging unit 20) to the workpiece W. The distance measuring part 24 of this embodiment is a reflection laser displacement sensor. Alternatively, the distance measuring part 24 may be a sensor that measures the distance using an ultrasonic wave. Alternatively, the distance measuring part 24 may be a sensor that measures the distance using a linear scale.

The imaging device 22 images the workpiece W. Based on the result of the imaging, the robot 30 moves the imaging unit 20. Thereafter, the distance measuring part 24 measures the distance from the imaging unit 20 to the workpiece W. Based on the result of the measurement, the robot 30 moves the imaging unit 20 again. Thereafter, the imaging device 22 images the targeted region of the workpiece W again.

In the robot system 10 of this embodiment, the imaging device 22 performs imaging before and after the distance from the imaging unit 20 to the workpiece W is measured. Herein, the imaging of the workpiece W, which is performed before the distance measurement, is also referred to as "preliminary imaging". In addition, the movement of the imaging unit 20 based on the result of the preliminary imaging is also referred to as "preliminary movement". Also, the movement of the imaging unit 20, which is performed according to the result of the measurement of the distance from the imaging unit 20 to the workpiece W, is also referred to as "actual movement". Further, the imaging of the workpiece W, which is performed after the actual movement, is also referred to as "actual imaging".

The robot controller 50 changes the posture of the robot (generates the operation track of the robot 30) based on teaching data. The teaching data includes data that defines the posture to be taken (operation form) of the robot 30 (teaching point data). Further, in this embodiment, the robot controller 50 controls not only the robot 30 but also the imaging controller 40. The imaging controller 40 controls the imaging unit 20. That is, the robot controller 50 controls not only the robot 30 but also the imaging unit 20 (the imaging device 22 and the distance measuring part 24).

The robot controller 50 has a storage device 51 and a processor 52. The robot controller 50 is connected to the servomotors of the robot 30. The servomotors of the robot 30 change the posture of the robot 30 (operate the robot 30) in response to operation instructions from the robot controller 50.

The storage device 51 previously stores the teaching data that designates the posture of the robot 30. For instance, the teaching data designates the posture of the robot 30 in initial state (initial posture thereof) and the posture of the robot 30 subsequent to the initial. In addition, the teaching data includes teaching data for defining the operation of the imaging unit 20 and the robot 30.

In this embodiment, the teaching data further includes the following operation instructions:

the operation instruction for changing the robot 30 from the initial posture to the posture that enables the preliminary imaging;

the operation instruction for executing the preliminary imaging by the imaging device 22 when the posture of the robot 30 is the posture that enables the preliminary imaging;

the operation instruction for changing the posture of the robot 30 based on the result obtained by the preliminary imaging;

the operation instruction for allowing the distance measuring part 24 to measure the distance from the imaging unit 20 to the object of interest (typically, the workpiece W);

the operation instruction for changing the posture of the robot 30 so that based on the result of the measurement of the distance from the imaging unit 20 to the object of interest, the distance becomes a predetermined distance; and the operation instruction for executing the actual imaging by the imaging device 22 thereafter.

In addition, as described later, after the actual imaging, the posture of the robot 30 can also be changed. In this case, the posture of the robot 30 may be designated according to the teaching data.

Based on such teaching data, the processor 52 of the robot controller 50 transmits the operation instructions to the servomotors of the robot 30 and the imaging controller 40. When the robot 30 is playback controlled, the processor 52 generates the operation instructions to be transmitted to the servomotors and the imaging unit 20 based on the teaching data. The processor 52 transmits these operation instructions to the servomotors and the imaging controller 40 via a communication path.

The imaging controller 40 controls the imaging unit 20 based on the image obtained by the preliminary imaging or the actual imaging by the imaging device 22 and/or on the distance measured by the distance measuring part 24. The imaging controller 40 has a storage device 41 and a processor 42. The imaging controller 40 is connected to the imaging unit 20 and the robot controller 50.

The storage device 41 stores a reference image. The reference image is an ideal image obtained by imaging the workpiece W at a predetermined distance D. The processor 42 extracts the region corresponding to the reference image stored in the storage device 41 from the image that is preliminarily imaged by the imaging device 22 (preliminarily obtained image). The extraction may be performed by using the characteristic point of the previously stored workpiece W. Thereafter, the processor 42 calculates the amount of movement (position correction data) for preliminarily moving the imaging unit 20 from the preliminarily imaged position, and outputs the amount of movement to the robot controller 50.

In addition, after the preliminary movement, based on the result of the measurement of the distance measuring part 24, the processor 42 calculates the amount of movement so that the distance between the imaging unit 20 and the workpiece W becomes the predetermined distance D, and then outputs the amount of movement to the robot controller 50. Further, the processor 42 performs a pattern-matching process for computing the degree of matching between the image, which is actually imaged by the imaging device 22, and the reference image. The processor 42 compares the matching degree with the threshold value to determine the pass or failure of the workpiece W.

Typically, the actual imaging cannot be appropriately performed by simply changing the posture of the robot 30 as designated by the teaching data. This is caused by the design error of the workpiece W and the conveying error of the workpiece W. However, the robot system 10 can perform high accuracy imaging. When working (e.g., processing) is performed on the workpiece W, the working operation may be compensated for or changed (corrected) based on the image obtained by the actual imaging (actually obtained image). Alternatively, the workpiece W may be measured based on the actually obtained image.

The robot system 10 is preferably used for at least one of the working (e.g., processing) and the measurement with respect to a plurality of workpieces W. In addition, even when the operation (posture) of the robot 30 is previously taught, it can be changed according to the workpiece W, as needed.

Figure 2A:
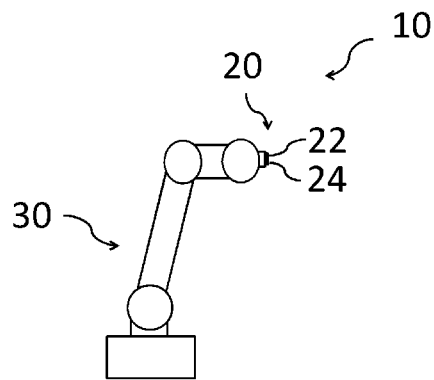
FIGS. 2A to 2E are schematic diagrams illustrating an imaging method of the first embodiment.

Hereinafter, an imaging method of this embodiment will be described with reference to FIGS. 2A to 2E. First, as illustrated in FIG. 2A, the robot system 10 is prepared. As described above, the robot system 10 includes the imaging unit 20, and the robot 30 to which the imaging unit 20 is attached. The imaging unit 20 has the imaging device 22 and the distance measuring part 24.

The robot controller 50 controls the following process (the processor 52). As illustrated in FIG. 2B, the imaging device 22 images the workpiece W. The workpiece W has the targeted region. The imaging device 22 preliminarily images the region of the workpiece W including the targeted region. The targeted region of the workpiece W may have an appearance characteristic. In FIG. 2B, the targeted region of the workpiece W is indicated by X. For instance, the targeted region of the workpiece W may be provided with a specified mark or one or more holes or openings. In addition, for instance, the region corresponding to the previously stored reference image (targeted region) may be specified from the image preliminarily imaged by the imaging device 22 to compare the targeted region of the preliminarily obtained image with the targeted region of the reference image.

Figure 2D:
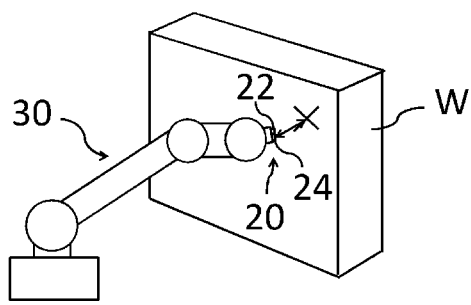
Figure 2B:
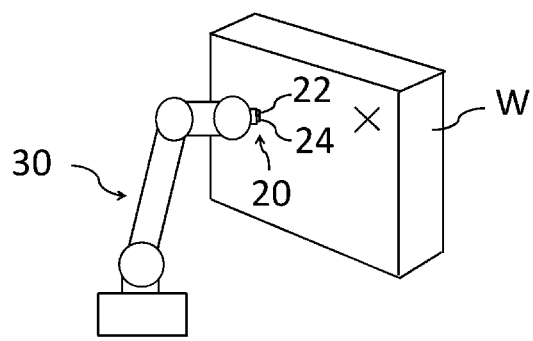
Figure 2E:
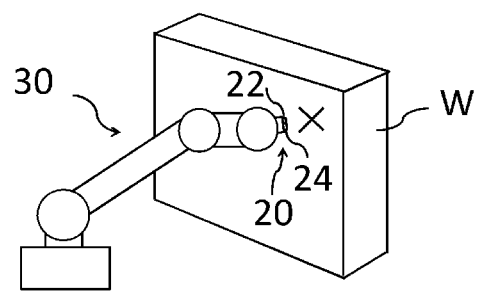
Figure 2C:
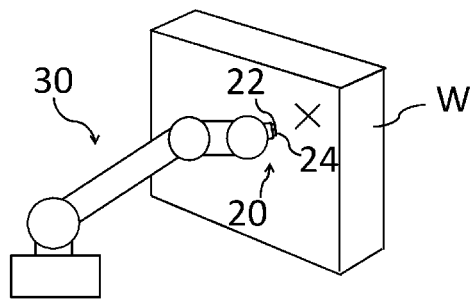

As illustrated in FIG. 2C, the robot 30 preliminarily moves the imaging unit 20 based on the preliminarily obtained image. For instance, the robot 30 preliminarily moves the imaging unit 20 so that the imaging device 22 can appropriately image the targeted region of the workpiece W. As an example, the direction and/or the distance of the preliminary movement of the imaging unit 20 by the robot 30 are/is determined from the result of the comparison of the preliminarily obtained image with the reference image.

As illustrated in FIG. 2D, after the imaging unit 20 is preliminarily moved, the distance measuring part 24 measures the distance from the imaging unit 20 to the workpiece W.

Next, as illustrated in. 2E, based on the result of the measurement, the robot 30 actually moves the imaging unit 20. Thereafter, the imaging device 22 actually images the targeted region of the workpiece W. In the above manner, the targeted region of the workpiece W is imaged.

In the robot system 10 of this embodiment, the position of the workpiece W to be imaged is broadly obtained based on the result of the "preliminary imaging". Thereafter, based on the result of the measurement of the distance measuring part 24, the object to be imaged is actually imaged at substantially the same imaging distance as the reference image (distance D). Therefore, even in the case of using the imaging device 22 that is relatively inexpensive and has a low number of pixels, the workpiece W can be imaged at high accuracy. In addition, the actual imaging of the workpiece W is performed at substantially the same imaging distance as that of the reference image. Therefore, the accuracy of the pattern-matching process with respect to the actually obtained image is improved. Further, the amount of computation necessary for the computation for the processing (enlargement or reduction) of the compared image (the actually obtained image) can be reduced. Therefore, the computation process can be performed for a shorter time.

The actually obtained image can be used for product inspection. In the inspection, the pass or failure of the workpiece W is determined based on the matching degree of the actually obtained image and the reference image. Further, the actually obtained image can be used as follows: For instance, the actually obtained image and the reference image may be compared to calculate the displacement of the workpiece W. For instance, the position of the workpiece W can be displaced from the predetermined position (e.g., the position designated in the teaching data) due to the design error of the workpiece W and the conveying error of the workpiece W, for example. Even in such a case, the working position is changed according to the calculated displacement, so that appropriate working can be performed.

Alternatively, the shape and the length of the targeted region of the workpiece W may be measured based on the actually obtained image. For instance, the diameter of the specified mark in the targeted region of the workpiece W can be measured. Specifically, the edge of the specified mark in the actually obtained image is used. Thus, the number of pixels corresponding to the diameter of the mark can be calculated. In the robot system 10, the actual imaging is performed at the predetermined imaging distance D. Therefore, the number of pixels in the actually obtained image corresponds to the actual length substantially directly (substantially uniquely). The length of one pixel in the actually obtained image corresponds to the actual length on the workpiece W in the predetermined relation. Therefore, for instance, from the number of pixels of the specified mark in the actually obtained image, the actual diameter (length) of the specified mark can be measured. Alternatively, using the actually obtained image, the distance between the adjacent holes or openings present in the targeted region of the workpiece W can also be measured.

In the robot system 10 of this embodiment, after the preliminary imaging, the robot 30 preliminarily moves the imaging unit 20. Thereafter, the distance from the imaging unit 20 to the workpiece W is measured. Based on the result of the measurement, the robot 30 actually moves the imaging unit 20. Thereafter, the targeted region of the workpiece W is actually imaged. Therefore, the actual imaging is performed in the state that the distance between the imaging device 22 (imaging unit 20) and the workpiece W is the specified distance D. In this way, in the robot system 10 of this embodiment, the position of the imaging device 22 in the principal plane direction of the workpiece W is calculated based on the result of the preliminary imaging. Thereafter, the position of the imaging device 22 in the normal line direction of the principal plane of the workpiece W is adjusted based on the result of the measurement of the distance measuring part 24. Therefore, the displacement between the workpiece W and the imaging device 22 at the time of imaging can be reduced. Therefore, high accuracy imaging is performed from the predetermined position in three dimensions.

Further, in this embodiment, the imaging unit 20 is actually moved based on the result of the measurement of the distance from the imaging unit 20 to the workpiece W. However, after the actual movement, if necessary, the distance measuring part 24 may re-measure the distance from the imaging unit 20 to the workpiece W, and based on the result of the re-measurement, the robot 30 may further move the imaging unit 20. In addition, the movement of the imaging unit 20 may be performed in the state that the workpiece W is fixed or may be performed in the state that the workpiece W is also moved.

Figure 3:
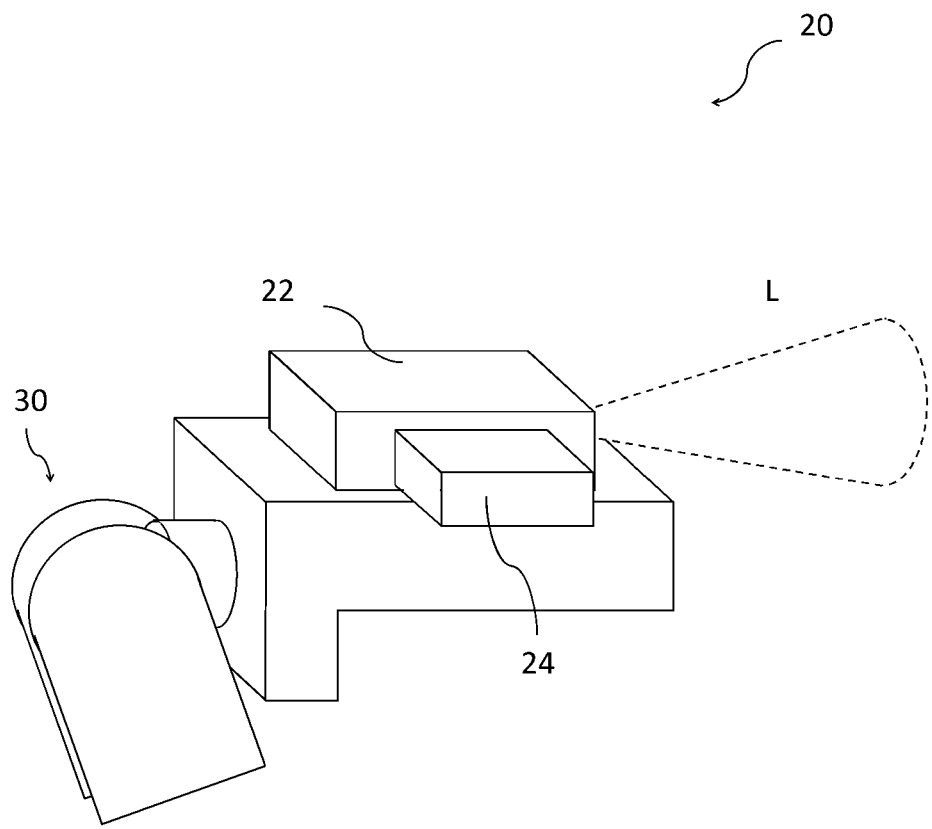
FIG. 3 is a schematic diagram illustrating an example of an imaging unit in the robot system of the first embodiment.

Here, the configuration of the imaging unit 20 in the robot system 10 of this embodiment will be described with reference to FIG. 3. FIG. 3 also illustrates the end portion of the robot 30. In the robot system 10, the distance measuring part 24 is provided integrally with the imaging device 22. When the imaging device 22 is directed to the workpiece W, the distance measuring part 24 is also directed to the workpiece W. The imaging device 22 images the range of a field of view L.

When it is dark around the robot system 10, appropriate imaging cannot be performed. Therefore, the robot system 10 may have an illuminating part (illuminating device). For instance, the illuminating part includes a light emitting diode (LED).

Figure 4:
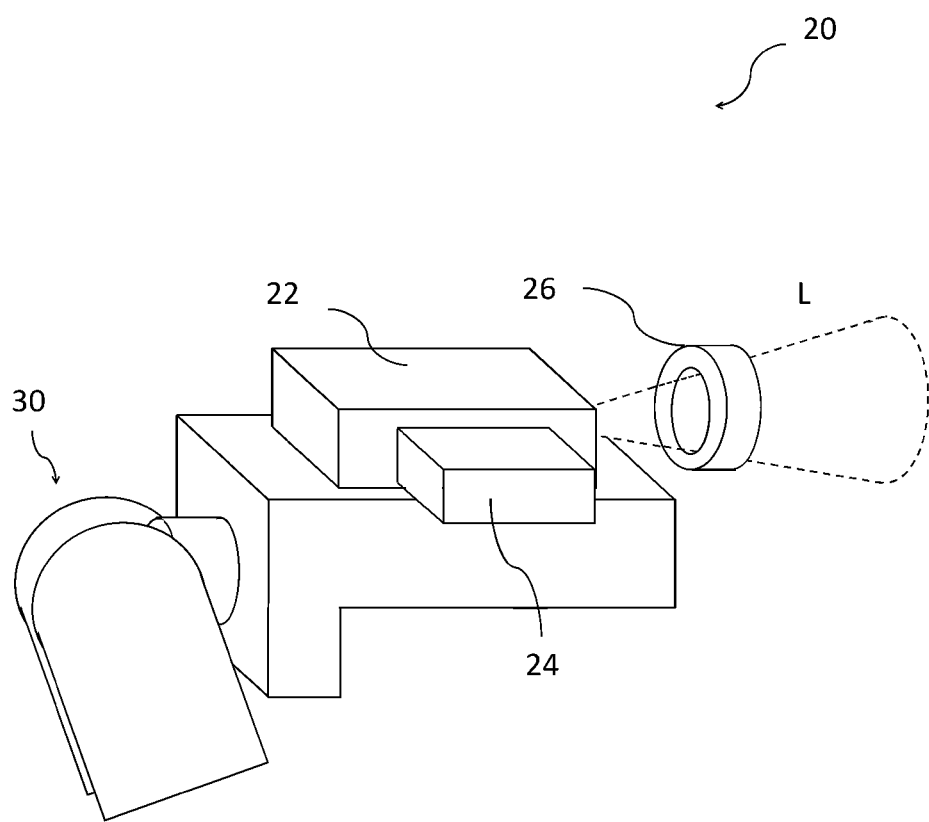
FIG. 4 is a schematic diagram illustrating an example of the imaging unit in the robot system of the first embodiment.

FIG. 4 illustrates a schematic diagram of another imaging unit 20 in the robot system 10 of this embodiment. The imaging unit 20 shown in FIG. 4 has substantially the same configuration as the imaging unit 20 described with reference to FIG. 3 except that the imaging unit 20 shown in FIG. 4 further has an illuminating part 26. Therefore, the description of the overlapped configuration is omitted to avoid redundancy. In the imaging unit 20 shown in FIG. 4, the illuminating part 26 has an annular shape. The illuminating part 26 is arranged on the imaging unit 20 so as not to enter into the field of view L of the imaging device 22. Therefore, the illuminating part 26 can efficiently illuminate the workpiece W.

Further, in the above description, the imaging device 22 and the distance measuring part 24 of the imaging unit 20 are integrally provided. However, this embodiment is not limited to this. The imaging device 22 and the distance measuring part 24 may be separately provided. In addition, in the above description, the imaging device 22 and the distance measuring part 24 of the imaging unit 20 are directed to the workpiece W at the same time. However, this embodiment is not limited to this. In the imaging unit 20, at the time of the actual imaging or the preliminary imaging, while the imaging device 22 is directed to the workpiece W, the distance measuring part 24 is not required to be directed to the workpiece W. In addition, at the time of the distance measurement, while the distance measuring part 24 is directed to the workpiece W, the imaging device 22 may not be directed to the workpiece W. For instance, the imaging device 22 and the distance measuring part 24 of the imaging unit 20 may be directed in the direction different from each other. The direction in which the imaging device 22 and the distance measuring part 24 are directed can be changed, as needed, by rotating the end of the robot 30 to rotate the imaging unit 20.

Further, as described above, at least one of the direction and the distance of the preliminary movement may be determined based on the comparison of the preliminarily obtained image with the previously stored reference image.

Second Embodiment

Figure 5:
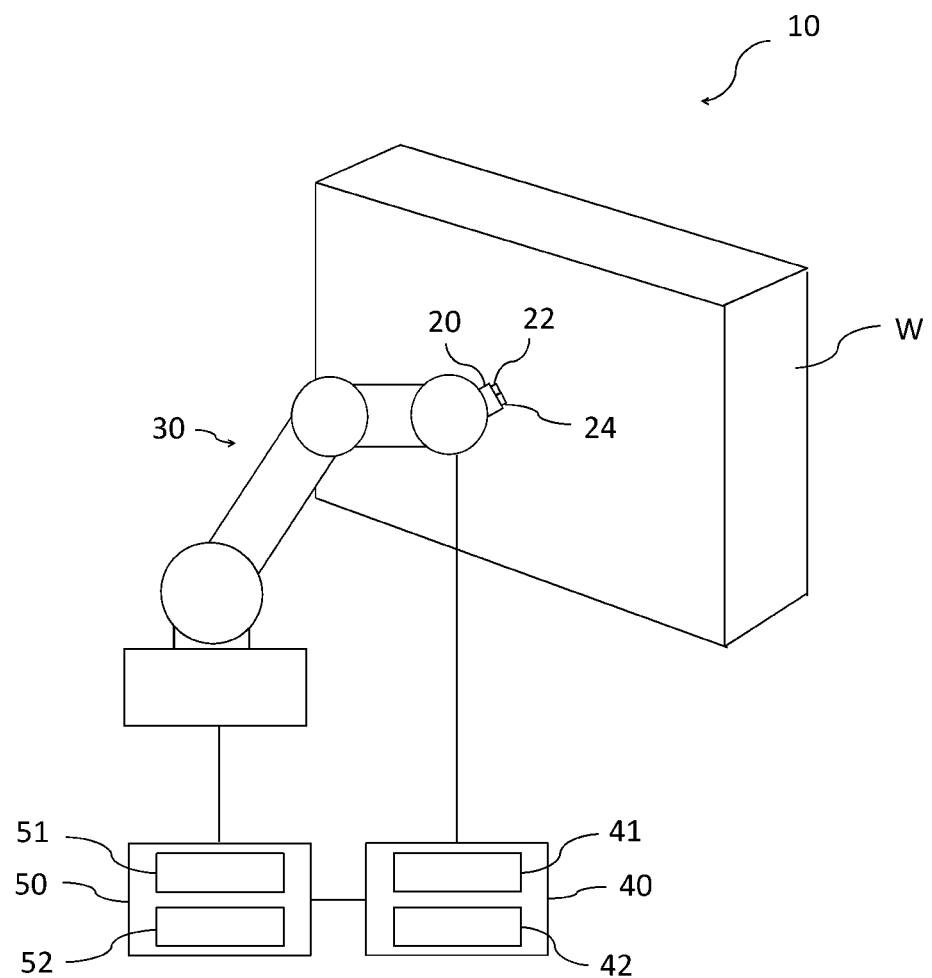
FIG. 5 is a schematic diagram illustrating a robot system of a second embodiment of the present disclosure.

FIG. 5 illustrates a schematic diagram of the robot system 10 of a second embodiment of the present disclosure. The robot system 10 of this embodiment has substantially the same configuration as the robot system of the first embodiment. Therefore, the description of the overlapped configuration is omitted to avoid redundancy.

The storage device 41 stores the reference image of the workpiece W. The processor 42 extracts the region corresponding to the reference image stored in the storage device 41 from the image that is preliminarily imaged by the imaging device 22. Based on the result of the extraction, the processor 42 calculates the matching degree of the preliminarily obtained image and the reference image. Based on such pattern matching, the processor 42 may determine at least one of the direction and the distance for preliminarily moving the imaging unit 20.

In addition, before or after the distance from the imaging unit 20 to the workpiece W is measured, the processor 42 may compare the image that is preliminarily imaged or is actually imaged by the imaging device 22 with the reference image stored in the storage device 41. The comparison is performed with respect to at least one point of e.g., the shape and the length. In the robot system 10, after the distance measurement, high accuracy actual imaging is performed. Therefore, the difference between the image, which is actually imaged by the imaging device 22, and the reference image can be compared at high accuracy.

Further, as described above, the working with respect to the workpiece W may be performed based on the result of the actual imaging. In this case, high accuracy working based on the result of the high accuracy imaging can be performed.

Figure 6:
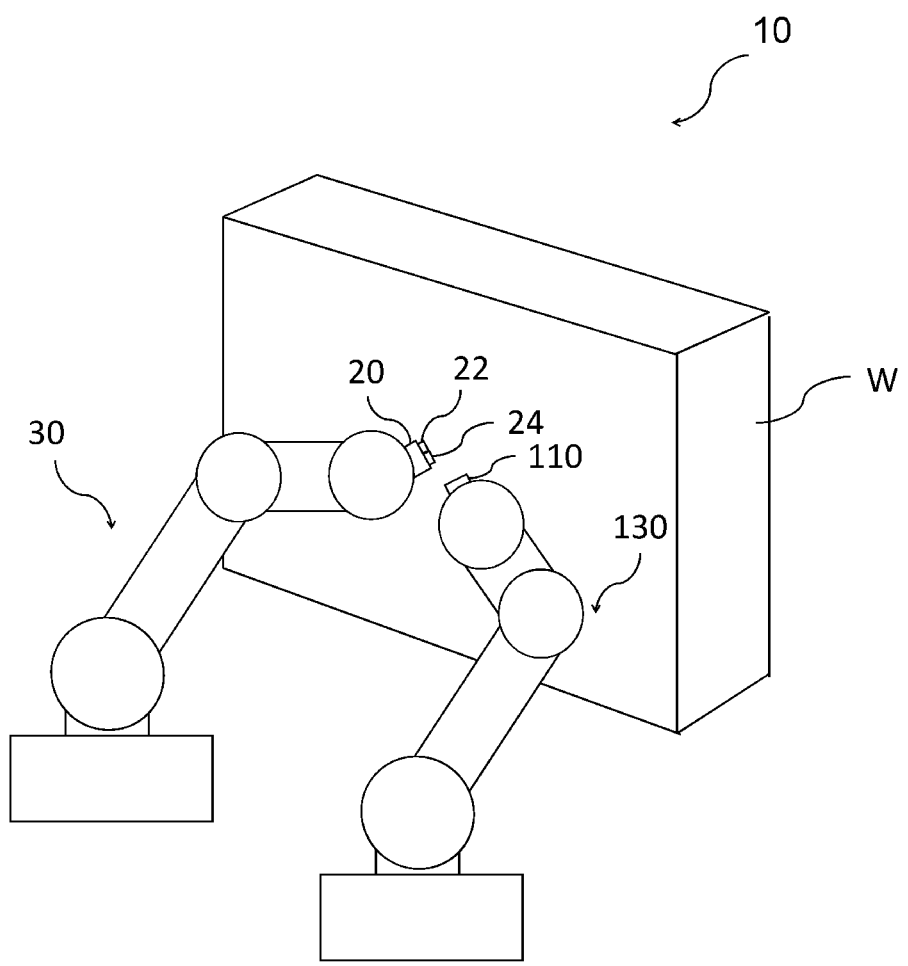
FIG. 6 is a schematic diagram illustrating the robot system of the second embodiment.

FIG. 6 illustrates a schematic diagram of the robot system 10 of this embodiment. The robot system 10 shown in FIG. 6 has the robot 30 to which the imaging unit 20 is attached, and another robot 130. An end effecter (working part) 110 is attached to the robot 130.

For instance, the end effecter 110 performs sealing. Alternatively, the end effecter 110 may perform welding or different processing. Alternatively, the end effecter 110 may perform working other than processing. Further, in the robot system 10 shown in FIG. 6, the end effecter 110 is attached to the robot 130 different from the robot 30 to which the imaging unit 20 is attached. However, this embodiment is not limited to this, and in addition to the imaging unit 20, the end effecter 110 may be attached to the robot 30.

Figure 7:
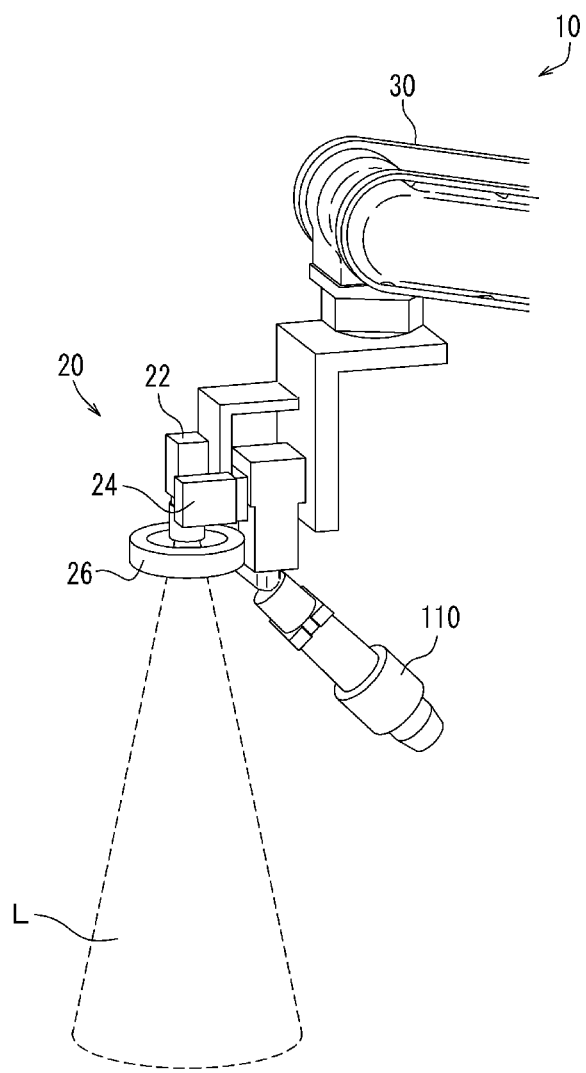
FIG. 7 is a partial schematic diagram illustrating the robot system of the second embodiment.

FIG. 7 illustrates a partial schematic diagram of the robot system 10. FIG. 7 illustrates the end portion of the robot 30. The imaging unit 20 is attached to the robot 30. The imaging unit 20 has the imaging device 22, the distance measuring part 24, and the illuminating part 26. In addition, in addition to the imaging unit 20, the end effecter 110 is attached to the robot 30. In the example shown in FIG. 7, the end effecter 110 is a sealing gun that performs sealing.

In the robot system 10 shown in FIG. 7, the end of the robot 30 is rotatable. The end of the robot 30 is rotated, so that which of the imaging unit 20 and the end effecter 110 is directed to the workpiece W can be selected.

Figure 8:
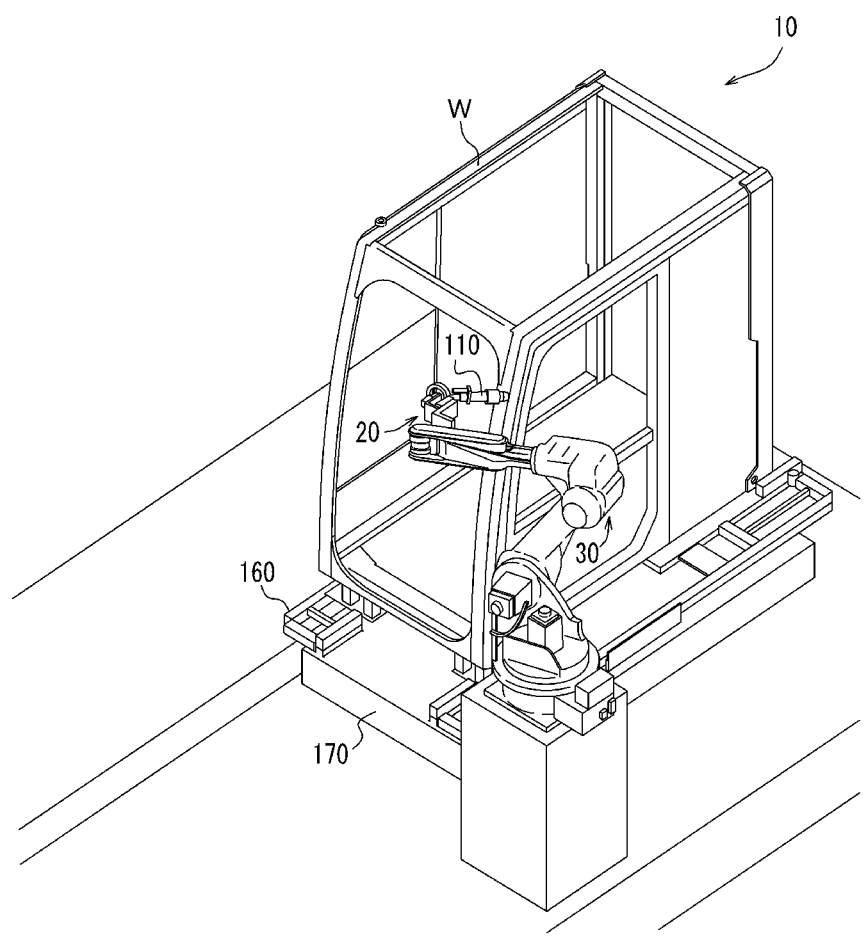
FIG. 8 is a schematic diagram illustrating the robot system of the second embodiment.
Figure 9:
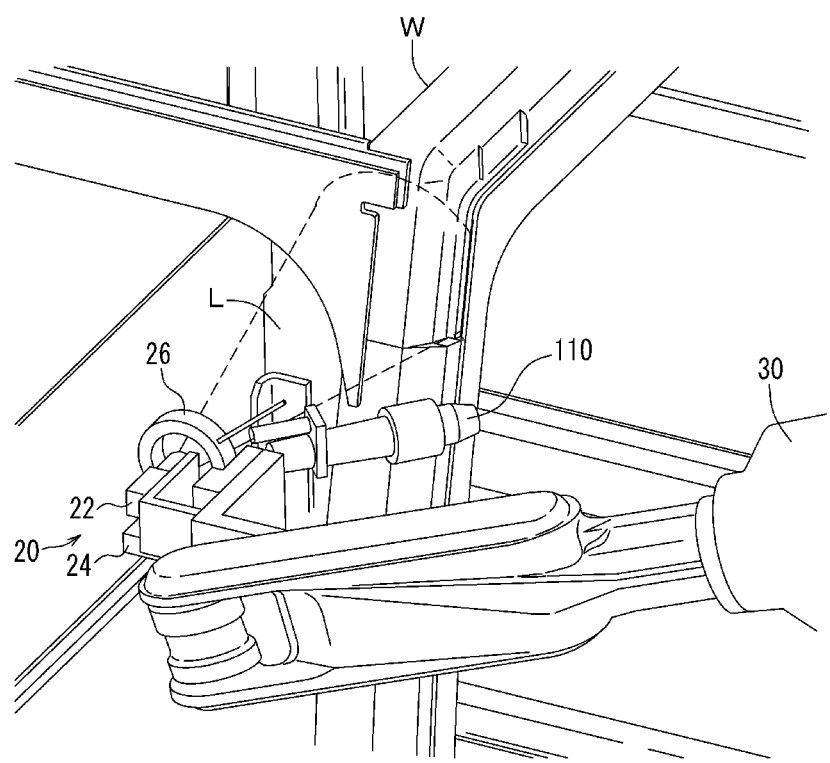
FIG. 9 is a schematic diagram illustrating imaging in the robot system of the second embodiment.
Figure 10:
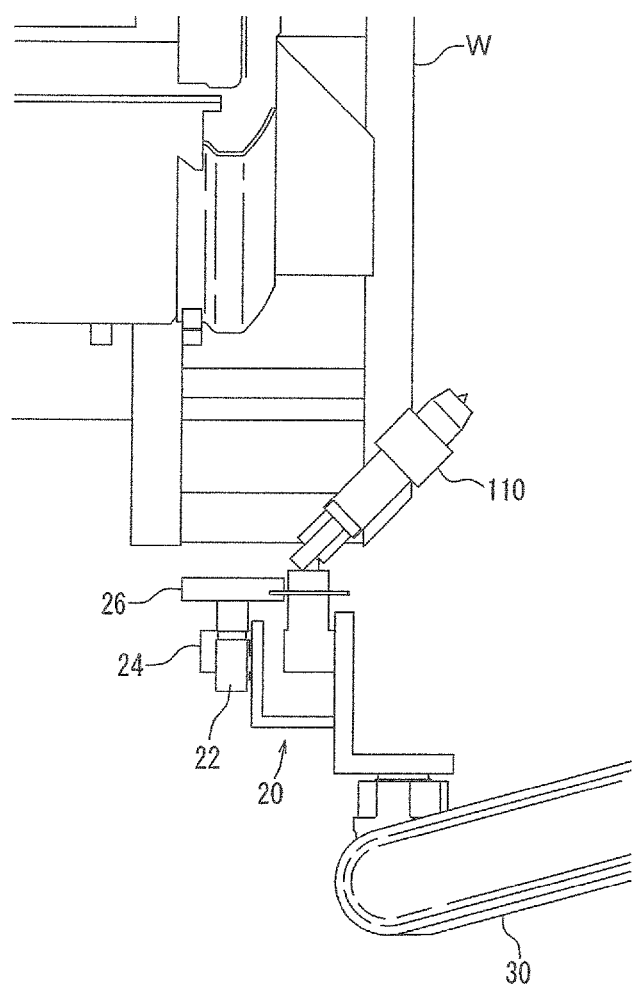
FIG. 10 is a schematic diagram illustrating a distance measurement in the robot system of the second embodiment.

Here, an example of the robot system 10 that performs the sealing will be described with reference to FIGS. 8 to 10. FIG. 8 illustrates a schematic perspective view of the robot system 10. As illustrated in. 8, the workpiece W is the cabin of a construction machine. The sealing gun 110 discharges a sealing material into the predetermined region of the workpiece W. The sealing material (sealing agent) functions as a waterproofing agent and an adhesive.

In the robot system 10 illustrated in FIG. 8, a conveying apparatus 170 moves a carriage 160 on which the workpiece W is placed. For instance, the carriage 160 onto which the workpiece W is set is loaded onto the conveying apparatus 170 in the workpiece set position. Thereafter, the conveying apparatus 170 conveys the carriage 160 to near the robot 30 to which the imaging unit 20 and the end effecter 110 are attached. After the completion of the imaging and the working, the conveying apparatus 170 conveys the carriage 160 onto which the workpiece W is set, to the workpiece discharge position. The carriage 160 onto which the workpiece W is set is unloaded from the conveying apparatus 170 in the workpiece discharge position. In this configuration, the conveying apparatus 170 is driven by the external shaft servo of the robot 30.

Here, an example of a series of procedures of the loading of the workpiece W onto the carriage 160, the conveying of the carriage 160, the imaging and the working with respect to the workpiece W, and the unloading of the carriage 160 from the conveying apparatus 170 will be described. For instance, first, an operator sets the workpiece W (cabin) onto the carriage 160 in the workpiece set position. At this time, the workpiece W is simply positioned with respect to the carriage 160. For instance, the position of the workpiece W is simply determined by the rails and the abutment of the carriage 160.

After the workpiece W is placed on the carriage 160, the operator activates a lifting device by the start button to lift the carriage 160. Thereafter, the conveying apparatus 170 is arranged under the lifted carriage 160. The carriage 160 is lowered, so that the carriage 160 on which the workpiece W is placed is loaded onto the conveying apparatus 170.

The conveying apparatus 170 conveys the carriage 160 on which the workpiece W is placed, to the predetermined position. Thereafter, the imaging device 22 and the distance measuring part 24 attached to the robot 30 execute the imaging and the distance measurement with respect to the workpiece W. For instance, as illustrated in. 9, the imaging device 22 preliminarily images the targeted region of the workpiece W. Here, the targeted region is the region located at the corner of the workpiece W (cabin). The characteristic point of e.g., the screw and the corner is extracted from the image that is preliminarily imaged by the imaging device 22, thereby specifying the position of the targeted region. Based on the position, the robot 30 preliminarily moves the imaging unit 20. For instance, the position error is calculated from the difference between the position of the targeted region specified from the preliminarily obtained image by the imaging device 22 and the previously taught position. Based on the error (provisional value), the imaging unit 20 may be preliminarily moved.

Next, as illustrated in. 10, the distance measuring part 24 measures the distance from the imaging unit 20 to the workpiece W. For instance, the distance error amount is calculated from the difference between the measured distance and the previously taught distance.

Then, the robot 30 actually moves the imaging unit 20 based on the result of the measurement. For instance, the robot 30 actually moves the imaging unit 20 so that the distance between the imaging unit 20 and the workpiece W has the predetermined value D. Thereafter, the imaging device 22 actually images the targeted region of the workpiece W. By the matching process of the actually obtained image which is the result of the actual imaging and the reference image, position error information showing the difference between the working start position which is previously set to the teaching data and the actual position of the targeted region of the workpiece W is calculated.

Then, based on the position error information, the robot 30 moves the sealing gun 110 directed to the workpiece W from the position designated by the teaching data. Thereafter, the sealing working is performed. Such moving of the sealing gun 110 by the robot 30 is performed based on the instruction from the processor 52 of the robot controller 50.

After the completion of the sealing working, the conveying apparatus 170 conveys the carriage 160 on which the workpiece W is placed, into the workpiece discharge position. In the workpiece discharge position, the carriage 160 on which the workpiece W is placed is held by the lifting device and is unloaded from the conveying apparatus 170. Thereafter, the conveying apparatus 170 is returned to the workpiece set position. After the conveying apparatus 170 is moved away from the workpiece discharge position, the lifting device is lowered. The operator draws out the carriage 160 on which the workpiece W is placed. In the above manner, the workpiece W can be sealed at high accuracy. In addition, the above operation can also be performed on a plurality of workpieces W. In this case, the plurality of workpieces W can be imaged under the same conditions. Therefore, under the same calibration conditions, the plurality of workpieces W can be imaged. Therefore, the sealing position can be compensated for at high accuracy.

Further, in the above description, one distance measuring part 24 is attached to one robot 30. However, this embodiment is not limited to this. Three distance-measuring parts 24 may be attached to one robot 30. Thereby, the tilt of the workpiece W can be obtained. Further, in this case, the three distance-measuring parts 24 may be arranged to be relatively apart from each other.

In addition, in the above description, one robot 30 to which the imaging unit 20 and the end effecter 110 are attached is arranged with respect to one workpiece W. However, this embodiment is not limited to this. A plurality of robots 30 to each of which the imaging unit 20 and the end effecter 110 are attached may be arranged with respect to one workpiece W.

Third Embodiment

Figure 11:
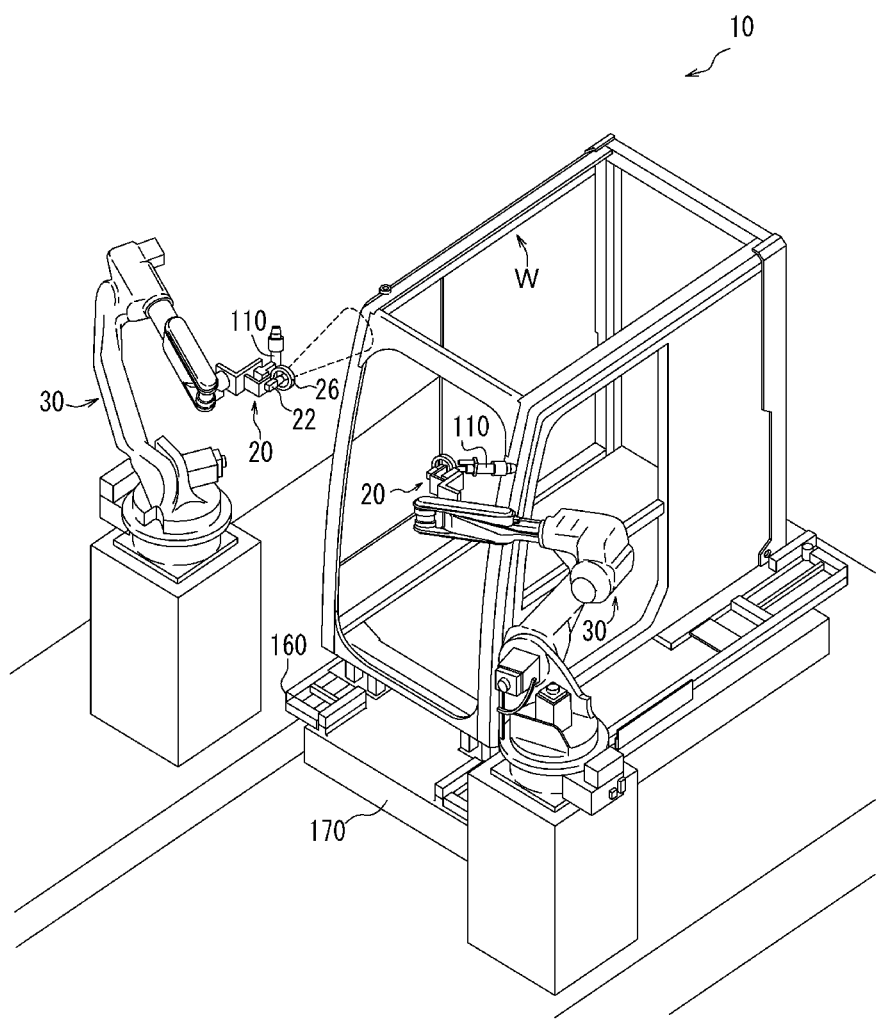
FIG. 11 is a schematic diagram illustrating a robot system of a third embodiment of the present invention.

FIG. 11 illustrates a schematic diagram of the robot system 10 of a third embodiment of the present disclosure. In the robot system 10 illustrated in FIG. 11, a plurality of robots 30 to each of which the imaging unit 20 and the end effecter 110 are attached are arranged with respect to one workpiece W. Except for this point, the robot system 10 illustrated in FIG. 11 has the same configuration as the robot system 10 described with reference to FIGS. 8 to 10. Therefore, the description of the overlapped configuration is omitted to avoid redundancy. As illustrated in. 11, a plurality of positions of the workpiece W may be imaged by the plurality of robots 30 to each of which the imaging unit 20 and the end effecter 110 are attached. Thereby, the working (e.g., processing) and the measurement with respect to the workpiece W can be performed for a short time.

Further, in the robot system 10 illustrated in FIG. 1, the distance measurement and the imaging with respect to the workpiece W are performed by a set of the imaging unit 20 and the robot 30. However, also in the robot system 10, the distance measurement and the imaging with respect to the workpiece W may be performed by a plurality of sets of the imaging units 20 and the robots 30. For instance, the distances to three positions of the workpiece W are measured by three sets of the imaging units 20 and the robots 30. Thus, information of the tilt of the workpiece W can be obtained.

The robot system 10 of this embodiment can image the workpiece W at high accuracy. Using such a result of the imaging, high accuracy working can be preferably performed. Alternatively, the result of the imaging may be used for measuring the workpiece W.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A robot system comprising:
an imaging unit including an imaging device and a distance measuring part;
an imaging controller configured to control the imaging unit, the imaging controller including a storage device that stores a reference image; and
a robot to which the imaging unit is attached,
wherein the imaging device preliminarily images a workpiece, the robot preliminarily moves the imaging unit based on the result of the preliminary imaging, the distance measuring part measures the distance to the workpiece, the robot actually moves the imaging unit based on the result of the measurement, and the imaging device actually images the workpiece,
wherein the distance measuring part is distinct from and separately or integrally provided relative to the imaging unit and measures the distance to the workpiece prior to the robot actually moving the imaging unit and prior to the imaging device actually imaging the workpiece, and
wherein the reference image and the actual image are imaged at substantially the same distance from the workpiece.

2. The robot system according to claim 1, further comprising a robot controller which controls the robot based on teaching data that defines the operation form of the robot,
wherein the robot controller controls the robot so as to change the posture of the robot based on the result of the actual imaging of the imaging device.

3. The robot system according to claim 1, wherein at least one of the direction and the amount of movement of the preliminary movement is determined based on the result of the preliminary imaging and the reference image, and
wherein the reference image is an ideal image of the workpiece stored prior to preliminarily imaging the workpiece.

4. The robot system according to claim 1, further comprising an end effecter that performs working with respect to the workpiece, the end effecter being attached to the robot, wherein the position in which the working is performed by the end effecter is changed based on the result of the actual imaging of the imaging device.

5. The robot system according to claim 4, wherein the end effecter is a sealing gun that discharges a sealing material.

6. An imaging method comprising:

preparing a robot system that has an imaging unit including an imaging device and a distance measuring part, and a robot to which the imaging unit is attached, and an imaging controller configured to control the imaging unit, the imaging controller including a storage device that stores a reference image;

using the imaging device to preliminarily image a workpiece;

preliminarily moving the imaging unit by the robot based on the result of the preliminary imaging;

after the preliminary movement, measuring the distance to the workpiece by the distance measuring part; and actually moving the imaging unit by the robot based on the result of the measurement to actually image the workpiece by the imaging device, wherein the distance measuring part is distinct from and separately or integrally provided relative to the imaging unit and measures the distance to the workpiece prior to the robot actually moving the imaging unit and prior to the imaging device actually imaging the workpiece, and wherein the reference image and the actual image are imaged at substantially the same distance from the workpiece.

7. The robot system according to claim 4, wherein the robot system selectively directs one of the imaging device and the end effector toward the workpiece.

\* \* \* \* \*